April 16, 1946. E. J. MASON 2,398,436
SELF-LOCKING, IDENTICAL HALF HANDLE STRUCTURE
Filed Feb. 9, 1945
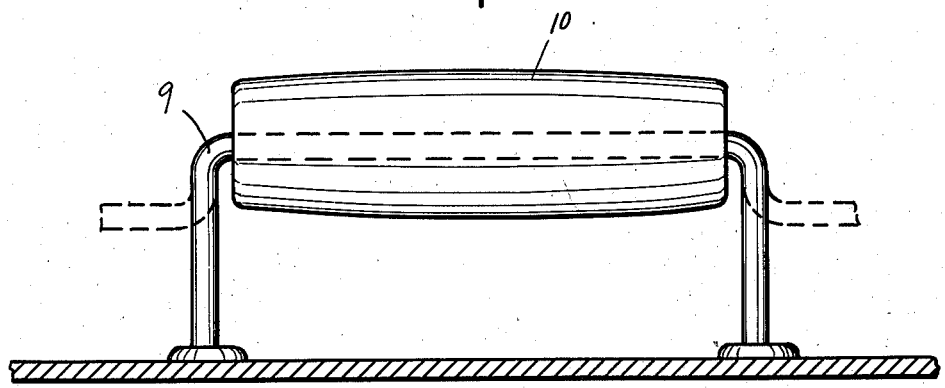
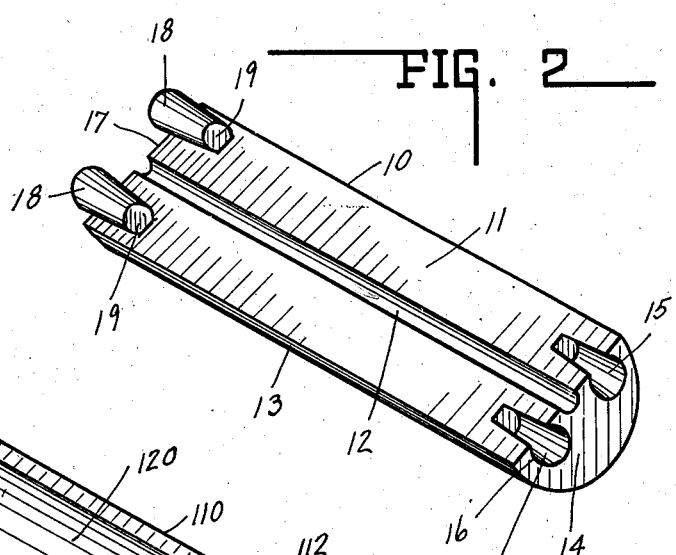
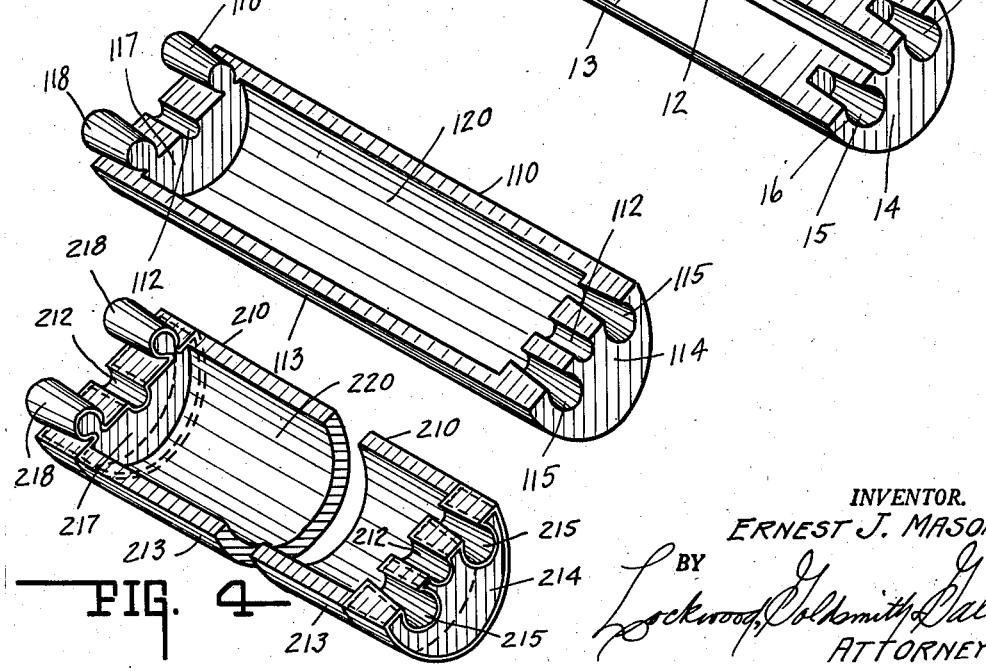
INVENTOR.
ERNEST J. MASON.
BY
Lockwood, Galtsmith & Galt,
ATTORNEYS.

Patented Apr. 16, 1946

2,398,436

UNITED STATES PATENT OFFICE 2,398,436

SELF-LOCKING, IDENTICAL HALF HANDLE STRUCTURE

Ernest J. Mason, Marion, Ind.

Application February 9, 1945, Serial No. 577,103

7 Claims. (Cl. 16—114)

This invention relates generally to elongated handles wherein same is sectionalized and each half is identical to the other and such sections are moved relative to each other and longitudinally thereof for associating same together upon a bail, etc.

Such handles broadly are of the class illustrated in Patents No. 2,319,147 and No. 2,371,631, dated May 11, 1943, and March 20, 1945, respectively and issued to me upon applications Serial No. 408,535 and No. 497,009 respectively.

Such handles are of solid and hollow types and the complementary tongue and groove connections between identical half handles may be of non-tapering or of wedge tapering type as shown in the aforesaid patents.

Each of the aforesaid is characterized by opposite ends of the half handle section being identical or similar.

The present invention differs therefrom in that opposite ends of the half handle section are complementary. In other respects the present invention broadly is similar to those heretofore mentioned.

The present invention has the same objectives as the aforesaid patented handles, and the chief feature of this invention is the complementary ends aforesaid.

Other objects and features of the invention will be set forth more fully hereinafter.

The full nature of the invention will be understood from the accompanying drawing and the following description and claims:

In the drawing:

Fig. 1 is an elevational view of a handle embodying the invention applied to an offset portion of a bail (see dotted lines) of a coffee pot or smoothing iron cover (shown partly in section, see full lines), said handle herein having a barrel-like conformation.

Fig. 2 is a perspective view looking at the matching interior face of a solid half handle.

Fig. 3 is a similar view of a hollow embodiment.

Fig. 4 is a similar view of a hollow embodiment of the invention wherein the complementary ends are of preformed band type, thereby eliminating the necessity of molding the tongues and grooves.

In the drawing there is illustrated a portion 9 of a bail or handle and thereabout is the handle embodying the invention. This handle is comprised of two identical half handle sections and when the handle mounting portion of the bail is offset as it were, see Fig. 1, one half handle is positioned below the bail and the other is slid longitudinally of the first section and interlocked thereto when the locking tongue and grooves are wedge shaped. When they are not so shaped, they may be adhesively secured together. Herein the wedge type is illustrated by way of example.

In Fig. 2 the body 10 has a flat face 11 and a half barrel outer conformation 13. In face 11 is the longitudinal median groove 12 of semi-cylindrical or like sectional form. At one end in face 14 and extending inwardly thereof and spaced equidistant from groove 12 are the tapered recesses 15 that taper inwardly as shown. The recesses are of restricted throat type, see throat 16. Herein the recesses are of conical like type and are of a suitable length.

Projecting from face 11 at the opposite end 17 are the spaced tongues 18 having restricted necks 19. The spacing between these tongues and groove 12 corresponds to that between the seats or recesses and that groove. The tongues are also tapered inwardly and are of a size to seat and friction lock in said seats and preferably are complementary thereto.

This invention is characterized by the opposite ends of the half handle being complementary and not identical, although the two half handles are identical. The length of the tongues is preferably the same or just short of the length of the recesses. Note tongues herein taper in the same direction and the grooves taper in the same direction and each taper inwardly towards the other. In effect also the tongues and recesses on opposite sides of groove 12 are longitudinally aligned also laterally offset and oppositely from the face 11.

When one half handle is placed on another in sufficient longitudinally offset relationship at least sufficient for the tongues 18 to lap the face 14 of the other section and each has its groove 12 in bail engagement, the tongues will wedge-seat in the confronting recesses when the half handles are registered one with the other.

Since the non-tapering form of the invention has no wedge lock adhesive should be applied between the tongue and seats prior to the registration of the half handles.

In Fig. 3, a hollow embodiment is illustrated. Herein numerals of the one hundred series designate parts identical or similar to parts illustrated in Fig. 2 and designated by corresponding numerals of the primary series. Herein the body portion 110 is hollowed out as at 120 and accordingly the half handle is a shell defined by barrel wall 113 and end walls 114 and 117. Herein the thickness of the end walls is equal to the lengths of the seats 115 and tongues 118.

These structures are otherwise identical to that shown in Fig. 2 and the operation is the same.

It will be obvious that this invention readily lends itself to the formation of the ends of the half handle sections in the manner disclosed in application, Serial No. 554,947, to-wit: that these ends may be metal cups having the respective tongue and groove formations which are adapted to interfit when two half handles are longitudinally associated together.

Supplemental to the foregoing, reference is had to Fig. 4 wherein band ends instead of cup ends are illustrated. In this form the body 210 may be of chambered type as indicated at 220 and have a barrel-like exterior 213 if desired.

One end includes the metal band having the half groove 212 therein and between the identical inwardly tapering locking grooves 215. The body material fills out and is encompassed by this band forming the closed end 214 of the half handle.

In like manner the other end is closed as at 217 and the band defines and forms the half groove 212 and the inwardly tapering tongues 216. Of course, such bands may be employed in a so-called solid half handle such as illustrated in Fig. 2.

While the invention has been illustrated and described in great detail in the drawing and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. A handle comprising a pair of identical half handle sections, each section having a central bail receiving groove in the section confronting face, transverse tongue portions projecting from that face at one end of the section and at each side of the groove, reduced neck means connecting such portions to the section, the opposite end of the section having complementary recesses therein on opposite sides of the groove and spaced therefrom and having restricted throats opening upon said face, the sections being connectible by relative longitudinal movement therebetween for seating the tongues in the recesses.

2. A handle as defined by claim 1 wherein the length of the recess is at least equal to the length of the tongue portion seatable therein.

3. A handle as defined by claim 1 wherein each section is chambered between the ends, the chamber opening upon said face for hollow handle formation.

4. A handle as defined by claim 1 wherein each tongue portion is tapered inwardly and each recess is tapered inwardly from the outer end thereof for wedge locking between sections.

5. A handle as defined by claim 1 wherein each section is chambered between the ends, the chamber opening upon said face for hollow handle formation, the tongue portions having a length equal to the thickness of its end of the section, and the recesses having a length equal to the width of the end of section including same.

6. A handle as defined by claim 1 wherein each section is chambered between the ends, the chamber opening upon said face for hollow handle formation, the tongue portions having a length equal to the thickness of its end of the section, and the recesses having a length equal to the width of the end of section including same, and each tongue portion is tapered inwardly from the outer end thereof and each recess is tapered inwardly from the outer end of the same.

7. A handle as defined by claim 1 wherein the length of the recess is at least equal to the length of the tongue portion seatable therein, and each tongue portion is tapered inwardly from the outer end thereof and each recess is tapered inwardly from the outer end thereof for wedge locking.

ERNEST J. MASON.